B. W. FRANCE.
DEMOUNTABLE RIM.
APPLICATION FILED JUNE 3, 1921.
1,403,468.  Patented Jan. 10, 1922.
2 SHEETS—SHEET 1.
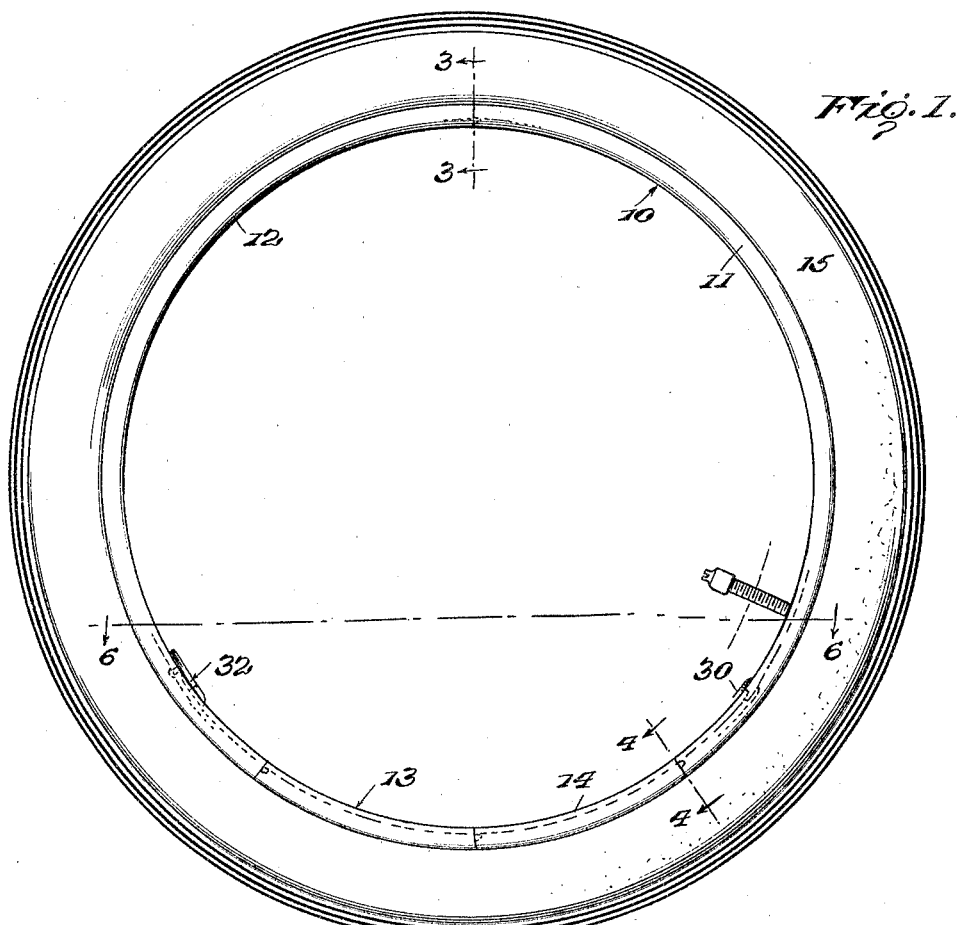
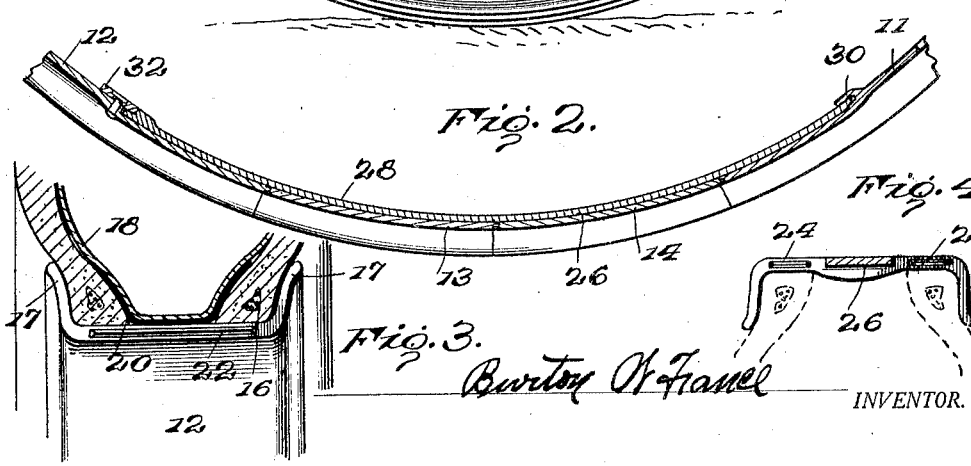
Burton W France, INVENTOR.

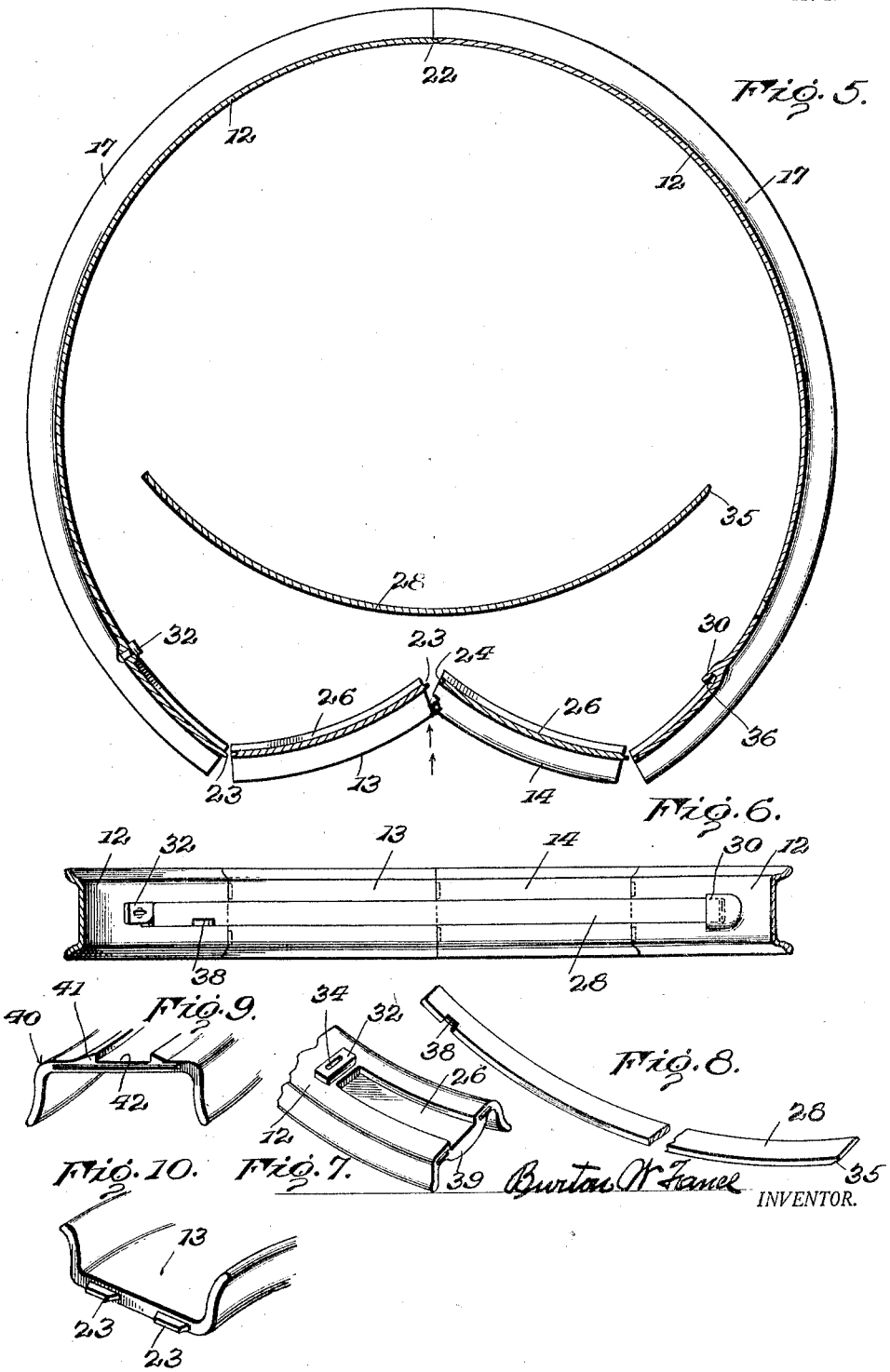

UNITED STATES PATENT OFFICE.

BURTON W. FRANCE, OF BROOKLYN, NEW YORK.

DEMOUNTABLE RIM.

1,403,468.  Specification of Letters Patent.  Patented Jan. 10, 1922.

Application filed June 3, 1921. Serial No. 474,742.

*To all whom it may concern:*

Be it known that I, BURTON W. FRANCE, a citizen of the United States, residing at Brooklyn, in the county of Kings and State of New York, have invented certain new and useful Improvements in Demountable Rims, of which the following is a specification.

This invention relates to rims especially adapted for use on the wheels of motor vehicles.

An important object of this invention is to provide a sectional rim which utilizes the pressure of the tire carried thereby as a means for holding the several sections together and for preventing the sections from rattling.

A further object of the invention is to provide a sectional rim which may be quickly attached to or removed from a tire without the necessity of employing a number of tools or without excessive effort on the part of the operator.

A further object is to provide a rim of the class described which is efficient, durable in use and cheap to manufacture.

Other objects and advantages of the invention will be apparent during the course of the following description.

In the accompanying drawings forming a part of this application and in which like numerals are employed to designate like parts throughout the same.

Figure 1 is a side elevation of the improved rim equipped with a tire.

Figure 2 is a detail sectional view through the rim.

Figure 3 is an end view of one of the sections of the rim, the view being taken on line 3—3 of Figure 1.

Figure 4 is a view taken on line 4—4 of Figure 1, the connecting means for the rim sections being shown in section and one of the rim sections being shown in end elevation.

Figure 5 is a sectional view through the rim, the parts being shown in the position they occupy preparatory to attaching the same to a tire.

Figure 6 is a sectional view taken on line 6—6 of Figure 1.

Figure 7 is a fragmentary perspective of one of the rim sections.

Figure 8 is a fragmentary perspective of a locking tongue for connecting the sections of the rim.

Figure 9 is a fragmentary perspective of a slightly modified form of rim section.

Figure 10 is a fragmentary perspective of one of the rim sections.

In the drawing the numeral 10 generally designates the rim which consists of arcuate sections 11 and 12 which are of a greater length than sections 13 and 14. The several sections of the rim are adapted to be detachably connected and held in that position principally by means of the air pressure contained in a tire 15 having beads 16 confined between the side flanges 17 and pressed laterally by means of the pressure within the tube 18. As illustrated in Figure 3, the usual flap 20 is arranged about the rim and has its edge portions engaged with the beads 16 so that the air pressure will be uniformly applied to the side flanges 17 whereby the several sections of the rim are securely though detachably held in position.

The section 12 of the rim is provided at one end with a transversely extending tongue 22 terminating adjacent the flanges 17 and adapted to be received within a transversely extending groove in the adjacent end of the section 11 so as to hold the sections 11 and 12 against lateral movement with relation to each other. The transversely extending tongue 22 which is arranged between the inner and outer sides of the section 12 is tapered to a point and the groove which receives the same is of a similar formation.

The sections 13 and 14 are provided at their ends with tongues and grooves 23 and 24 respectively cooperate with each other and with similar tongues and grooves in the adjacent ends of the sections 11 and 12 in providing a connection between the sections of the rim. With reference to Figures 4 and 10 it will be noted that the grooves or recesses 24 are arranged in pairs as are the tongues 23 which are received within the same. The recesses 24 of each pair are arranged on opposite sides of channels 26 formed in the sections 13 and 14 and the adjacent portions of the sections 11 and 12 for the reception of a locking strip designated by the numeral 28. The locking strip 28 when received within the channels 26 has its face flush with the inner face of the rim so as not to interfere with the application of the rim to a wheel. Further, the side walls of the channels 26 hold the locking strip 28 against lateral movement.

One end of the channel 26 formed in the section 11 is provided with an overhanging portion 30 which defines a cavity to receive the adjacent end of the locking strip 28 whereby to hold that end of the strip in position when the other end is held within the channel 26 in the section 12 by means of a pivoted latchplate 32. Figure 7 illustrates that the latchplate 32 is arranged adjacent the inner end of the channel 26 formed in the section 12 so that the plate may be rotated to engage the locking plate 28 and thereby hold the same in position. A longitudinal recess 34 is formed in the latch 32 so that a screwdriver may be engaged with the latch for the purpose of rotating the same. The ends of the locking strip 28 flatly engage the ends of the channels 26 and one end of the locking strip is bevelled as indicated at 35 so as to flatly contact with the inclined bottom wall 36 of the cavity formed by the overhanging portion 30. When it is desired to remove the locking strip 28 a screwdriver may be inserted into a notch 38 formed in one side of the strip.

In the form of the invention illustrated in Figure 7, the channel 26 is formed by pressing or stamping the rim in such a manner that a reinforcing rib 39 is formed on the outer side of the rim, which rib is located between the beads of the tire.

In the form of the invention illustrated in Figure 9 the rim section designated by the numeral 40 is adapted for application to a slightly different type of wheel felly and is provided with a pair of spaced ribs 41 which define a channel 42 for the reception of a locking strip.

In applying the rim, the sections 11 and 12 are engaged with the tire as illustrated in Figure 1 and the short sections 13 and 14 are now arranged in the manner illustrated in Figure 5. With the parts thus positioned the operator may step on the meeting ends of the sections 13 and 14 so as to cause the rim to assume a circular formation. The locking strip 28 is now inserted into the aligned channels 26, one end of the strip being confined within the cavity in the section 11 and the other end being securely held by the latch 32.

In use, the pressure of the tire is utilized to hold the several sections together in cooperation with the locking strip 28. Should the tire become deflated the same will remain on the rim since the beads are securely confined between the flanges 17.

I claim:—

1. A sectional rim comprising a pair of long arcuate sections and a pair of short arcuate sections cooperating with the long sections in forming a circle, the ends of the sections being formed with interlocking tongues and grooves, a locking strip applied to the inner sides of the short sections and overlapping the adjacent portions of the long sections, and means carried by the long sections for securing the locking strip in position.

2. A sectional rim comprising pairs of long and short sections having their ends formed with interlocking tongues and grooves detachably connecting the sections, said short sections and the adjacent portions of said long sections being formed with aligned channels, a locking strip received within said channels and having one of its ends beveled, the channel in one of said long sections being formed with a cavity receiving the beveled end of said locking strip and having an inclined bottom wall snugly contacting with the beveled portion of said locking strip, and a latch pivotally carried by the other long section and engaging the adjacent end of said strip.

3. A sectional rim comprising long and short sections having their ends formed with interlocking tongues and grooves detachably connecting the sections, said short sections and the end portions of said long sections being provided with aligned channels, a locking strip snugly fitted within said channels and having its ends contacting with the ends of the channels formed in said long sections, a pivoted latchplate connected to one of said long sections and engaging the adjacent end of said locking strip to hold the same within said channels, the inner face of said strip being flush with the inner faces of said sections.

4. A sectional rim comprising long and short arcuate sections having their ends formed with means whereby the same may be detachably connected, said short sections and said long sections being provided with aligned channels, a locking strip received within said channels and having its inner face flush with the inner faces of said sections, and means whereby the locking strip may be confined within said channels.

In testimony whereof, I have affixed my signature in the presence of two witnesses.

BURTON W. FRANCE.

Witnesses:
WALTER E. GIFFORD,
JERRY GRADY.